INVENTORS
BROOK J. DENNISON
RONALD R. RIGBY JR.
BY
ATTORNEYS

INVENTORS
BROOK J. DENNISON,
RONALD R. RIGBY JR.
BY
ATTORNEYS

Feb. 24, 1970   B. J. DENNISON ET AL   3,497,340
METHOD OF TEMPERING AND RESHAPING GLASS SHEETS
Original Filed Feb. 11, 1965
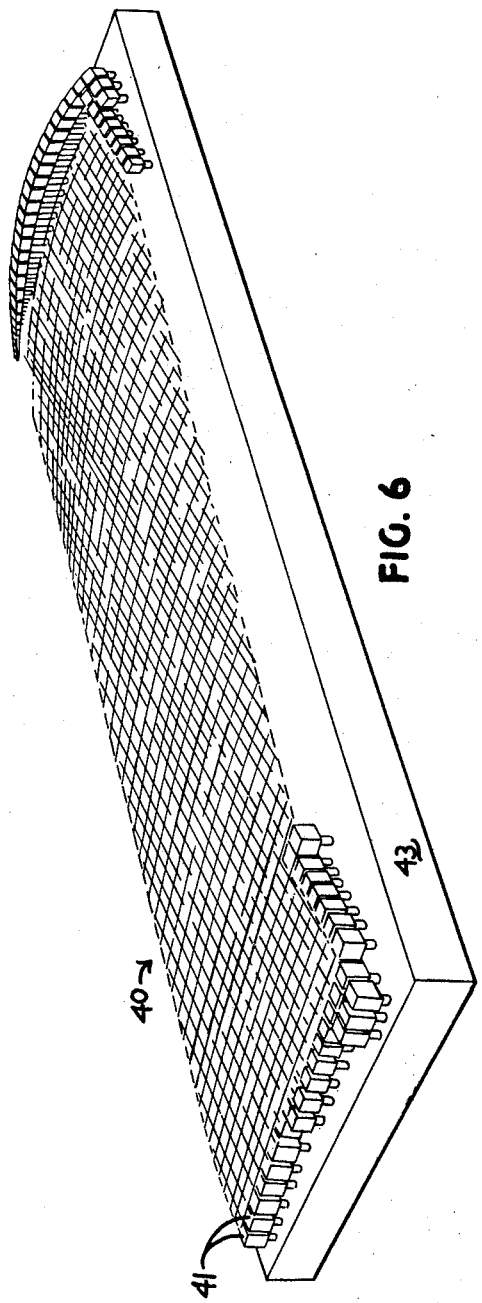
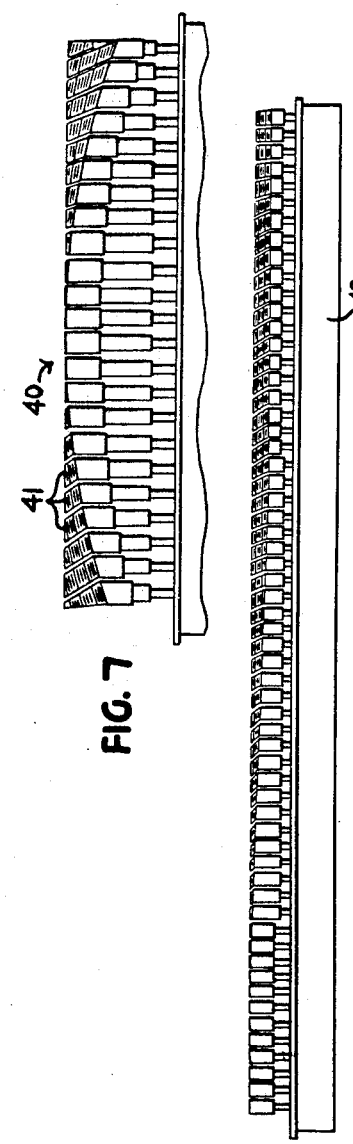
INVENTORS
BROOK J. DENNISON
BY RONALD R. RIGBY JR.
ATTORNEYS

United States Patent Office 3,497,340
Patented Feb. 24, 1970

3,497,340
METHOD OF TEMPERING AND RESHAPING GLASS SHEETS
Brook J. Dennison, Pittsburgh, Pa., and Ronald R. Rigby, Jr., Ridgefield, Conn., assignors to PPG Industries, Inc., Pittsburgh, Pa., a corporation of Pennsylvania
Continuation of application Ser. No. 666,695, Sept. 11, 1967, which is a continuation of application Ser. No. 431,794, Feb. 11, 1965, which in turn is a continuation-in-part of application Ser. No. 351,723, Mar. 13, 1964. This application July 29, 1968, Ser. No. 748,526
Int. Cl. C03b 27/00
U.S. Cl. 65—104                    3 Claims

ABSTRACT OF THE DISCLOSURE

A glass sheet is heated, tempered and shaped in a quench, the assumption of the shape is delayed until the glass is removed from the quench by cooling one side of the glass at a different rate than the other side, then while the glass is still within its annealing range the cooling rates are changed, and the glass is cooled to room temperature. A shape which is set in the glass during the initial cooling is delayed in forming until the glass is below the annealing range and outside the quench.

---

This application is a continuation of our earlier filed copending application, Ser. No. 666,695, filed Sept. 11, 1967, now abandoned which in turn is a continuation of our earlier filed application, Ser. No. 431,794, filed Feb. 11, 1965, now abandoned, which in turn is a continuation-in-part of our earlier filed application, Ser. No. 351,723, filed Mar. 13, 1964, now abandoned.

This invention relates to the fabrication of glass, and more particularly to the shaping and tempering of glass sheets.

There is a present demand, particularly in the automotive industry, for glass sheets of a compound curvature; that is, sheets curved in the direction of their length as well as transversely thereof and therefore having no straight line elements. It is, of course, possible to bend glass sheets to such curvatures by pressing glass suspended by tongs with complementary male-female solid molds. In addition, horizontal bending by gravity has been utilized using what is known as a "ring" mold contacting only the periphery of the glass being bent, the glass being allowed to sag to shape under the influence of heat and sometimes aided by moments of force applied through movable mold sections. One inherent disadvantage to such techniques is the necessity of contact between the glass sheet being bent and solid objects such as tongs or mold surfaces.

Methods and apparatus for bending glass sheets without contact between the glass and solid objects are disclosed in assignee's copending application Ser. No. 236,676, now Patent 3,223,501, James C. Fredley and George E. Sleighter, inventors, and the assignee's published Republic of South Africa patent application No. 62/3935, now Patent 3935/62. As disclosed therein, glass sheets are supported upon a flow of hot gas and conveyed along a horizontally extending bed of changing contour from flat to curved to produce a glass sheet curved in a direction transversely of the path of travel. One major advantage of such a process is that the glass sheets can be continuously conveyed on the support bed in the ultimate shape desired. However, when the desired shape of the finished sheet of glass has a compound curvature, i.e., a curvature extending in the direction of travel as well as transversely thereof, it becomes difficult to generate such a shape with a support bed while continuously conveying the sheet.

The present invention provides a method for providing compound curvatures while continuously conveying glass sheets and without the necessity of a support bed or other mold surface conforming to the shape ultimately desired. This process particularly lends itself to the above-mentioned process and apparatus in which the glass is supported upon a fluid, such as a flow of gas, and conveyed along a continuous path of travel while being heated and bent in a transverse direction and/or tempered. Briefly, this is accomplished by thermally superimposing in a controlled and reproducible manner, a permanent compound curvature on the initial shape or other shape to which the sheet is first physically conformed.

More specifically, compound curvatures of desired magnitudes are reproducibly produced by heating a glass sheet to a temperature suitable for tempering or bending through viscous flow of the glass, allowing the sheet to deform or positively conforming the sheet to a new contour if desired, and then quenching in a manner that cools one major surface of the sheet at a greater rate than the opposite major surface at a time when the temperature of the sheet is within the annealing range of the glass. The quench, in addition to tempering the sheet as it cools to a temperature at which it is no longer deformable through viscous flow, superimposes a permanent compound curvature upon the configuration of the sheet existing just prior to the quench. For example, a flat sheet will become a compound curved sheet; a glass sheet curved in one direction and having straight line elements extending in another direction will be shaped to a compound curvature of a decreased radius if the convex surface is cooled at a greater rate (producing a greater curvature in the direction it was previously curved and producing a curvature in the direction in which straight line elements previously extended) or, if the concave surface is cooled at a greater rate, the sheet will be shaped to an anticlastic curvature; and a glass sheet of a previous compound curvature will be changed to a new curvature of increased or decreased radii, depending upon which side is cooled faster.

Most advantageously, the present invention is practiced using the apparatus disclosed herein (and disclosed in more detail in the aforementioned published South African patent application) with which glass sheets are supported upon a flow of gas while heated, bent if desired, and quenched, thereby preventing contact of the glass with solid members and maintaining the precise shape desired through out the process. In the quench, upper and lower nozzle arrays are positioned in close proximity to the glass sheet being treated (i.e., a distance of less than 0.15 inch) to provide high rates of heat transfer and accurate control of heat transfer. It is a practical necessity therefore, that the glass sheet be temporarily maintained in substantially its initial configuration corresponding to that of the nozzle arrays while it is being quenched in order to prevent contact between the nozzles and the glass.

In accordance with the present invention, a sheet of glass being quenched between opposing flows of cooling fluid may be temporarily maintained in its initial configuration, notwithstanding the application of a greater cooling rate to one side than to the opposite side of the sheet, by reducing the initially established rates of cooling during the quenching operation while still maintaining the cooling rate applied to said one side greater than applied to the opposite side. Forces acting upon the glass sheet are thereby kept substantially in balance and the glass sheet is temporarily maintained essentially in its initial configuration corresponding to that of the nozzle array during the quenching operation.

By way of explanation, it is believed that the surface being quenched the faster tends to stabilize to a permanent dimension that is longer than that of the opposite surface because a higher fictive temperature is established in the surface being more rapidly cooled. On the other hand, the surface being quenched more slowly is at a higher temperature and is therefore temporarily thermally expanded to a greater extent than is the opposite surface. As long as both phenomena balance each other, the sheet remains in its initial configuration. However, it has been found that the thermal expansion of the side being cooled more slowly soon becomes inadequate to maintain the initial balance, particularly after the sheet has been cooled to about the lower temperature limit of the annealing range of the glass (i.e., about 1,050 degrees Fahrenheit surface temperature for commercial soda-lime-silica window and plate glass). As a result, the glass tends to bow. A reduction in the absolute cooling rates of both sides of the sheet, while still cooling the more rapidly quenched side at a faster rate, will temporarily counteract the developing imbalance and tendency of the sheet to bow, because the more slowly cooled side will reheat from heat internal to the sheet at a more rapid rate than will the opposite side. An increase in thermal expansion of the more slowly cooled surface results, and the sheet remains substantially in its initial configuration.

The attendant advantages of this invention and the various embodiments thereof will be readily appreciated as the same become better understood by reference to the following detailed description when considered in connection with the accompanying drawings in which:

FIG. 6 is a diagrammatic perspective view showing a gas film support bed, the generative surface of which progressively changes in contour from flat to a cylindrical shape in a cross section normal to the longitudinal axis of the bed;

FIG. 7 is an end elevation of the bed of FIG. 6 looking toward the part of maximum curvature;

FIG. 8 is a side elevation of the bed of FIG. 6 showing how the curve is developed along the path of travel of the glass.

Figure 1:
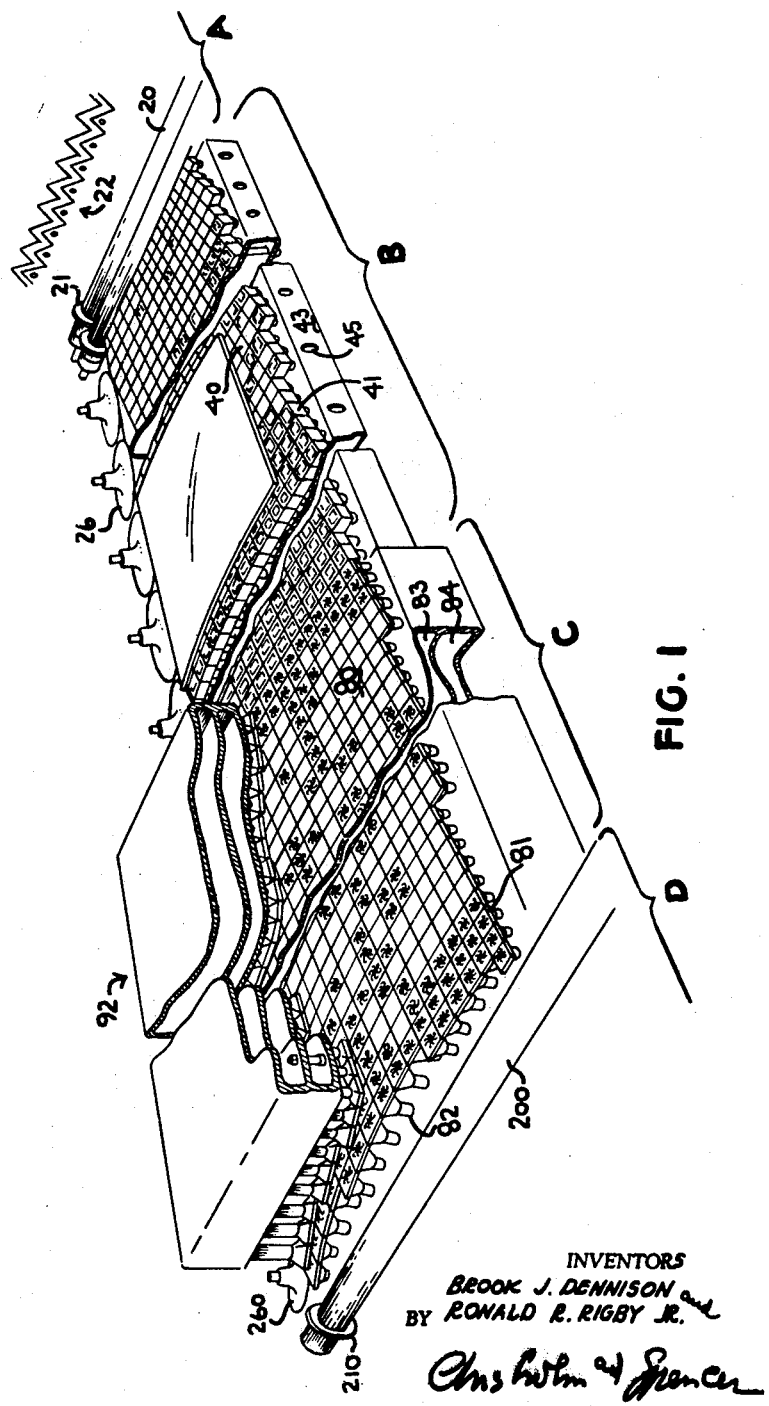
FIG. 1 is a perspective, partly schematic view, with parts omitted, illustrating a system for conveying, heating, bending and quenching sheet glass parts and facilitating the practice of the present invention.

Referring to the drawings, FIG. 1 diagramatically illustrates a system advantageously employed for heating flat glass parts to a deformation temperature, e.g., to a temperature at which the glass will deform to a supporting force and can be tempered, quenching such parts while hot and delivering the parts thus tempered onto a roll conveyor for removal. The component sections making up the complete system consist of a preheat section A wherein the glass is conveyed on rolls 20 between radiant heaters 22 above and below the glass to preheat the glass until brought to a suitable preheat temperature lower than the deformation temperature; a gas film support heating section B where the glass parts are transferred to, and supported on, the film of hot gas while being conveyed through a frictional drive such as drive wheels 26 contacting the edges only of such parts, supplemental heat being supplied by radiant heat sources above and below the glass until the glass reaches a temperature high enough for bending and tempering purposes; a quenching section C where the glass is rapidly chilled while suspended between opposed flowing films of cool air, edge contact driving being continued through the section by drive wheels 260; and a delivery roll system D which receives the tempered glass parts from the quenching system and conveys them to their next destination.

Figure 2:
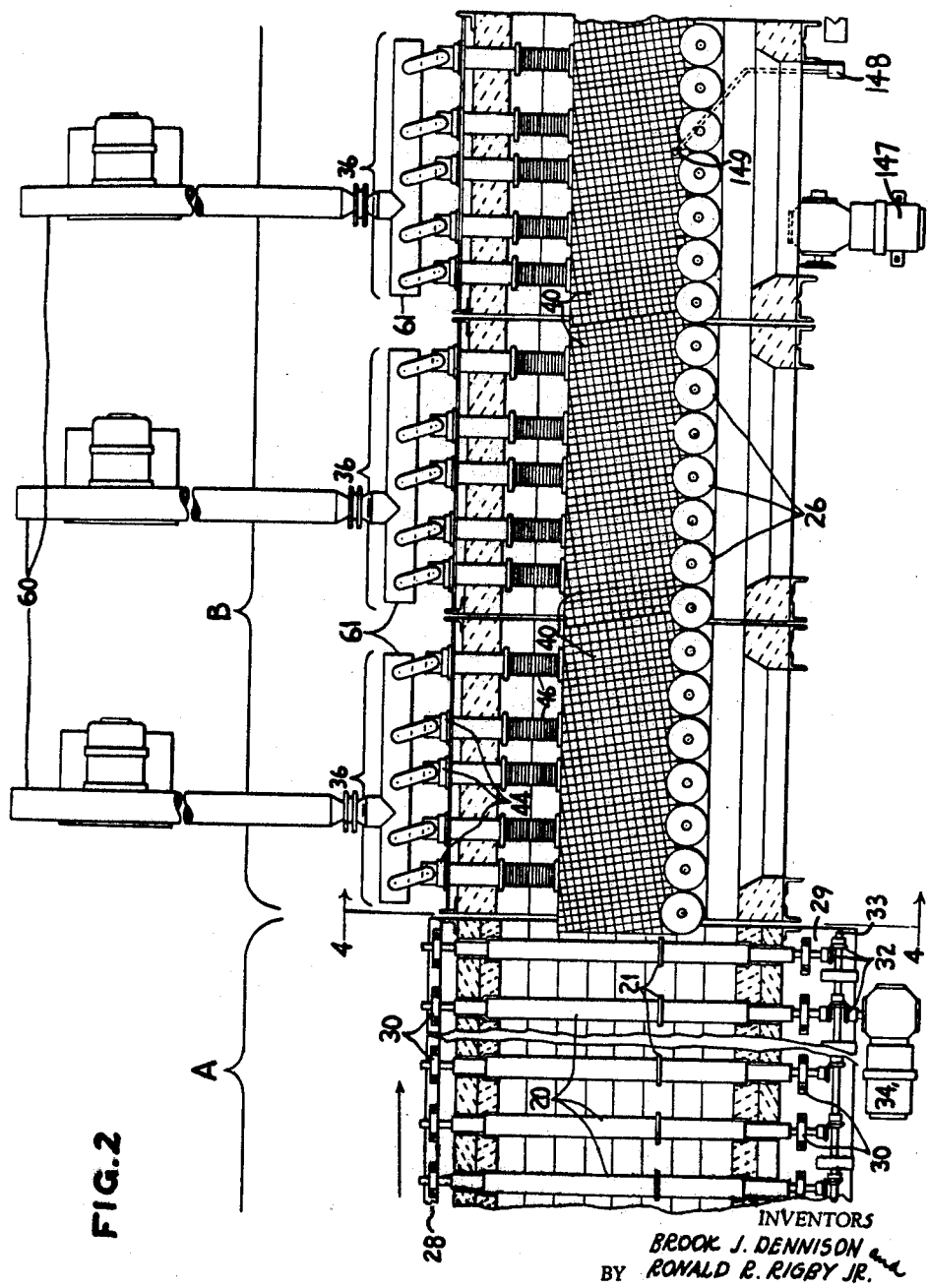
FIG. 2 is a partial plan view with parts removed showing the arrangement of a preheat section with respect to a gas film support heating section and the mechanism for conveying glass sheets.
Figure 3:
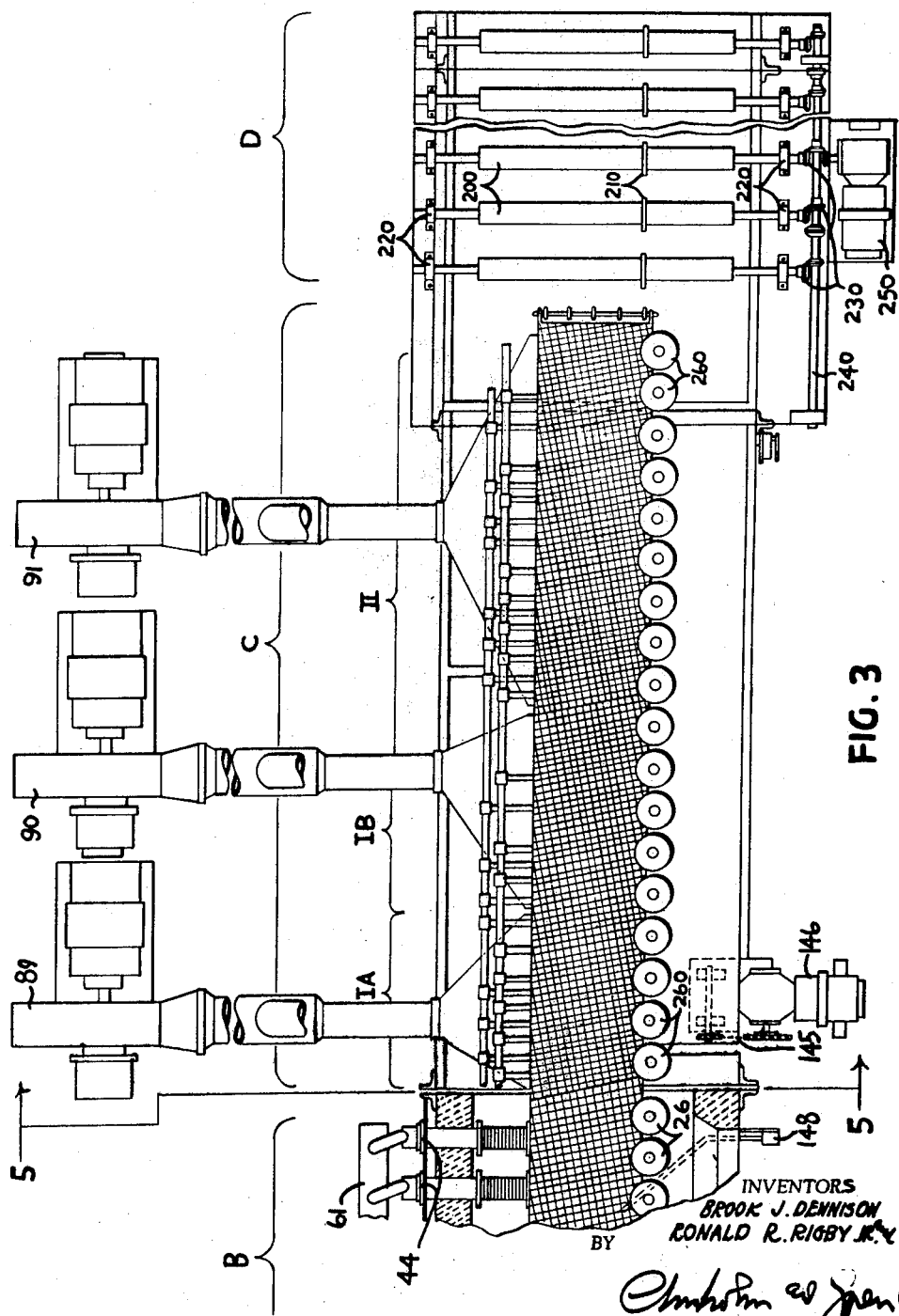
FIG. 3 is a partial plan view with parts removed, which is in effect a continuation of FIG. 2, and shows the terminus of the gas film support heating section adjacent a quenching section, the latter being followed by a conveyor roll run-out section.

As better shown in FIGS. 2 and 3, preheat section A includes longitudinally extending horizontal channels 28 and 29 that support bearings 30 in which are journaled conveying rolls 20. Conveying rolls 20 are provided with guide collars 21 in alignment throughout the section A so as to position the glass properly for transfer to the gas support next following. Each conveyor roll is driven through gears 32 by a common shaft 33 energized by drive motor 34.

Figure 4:
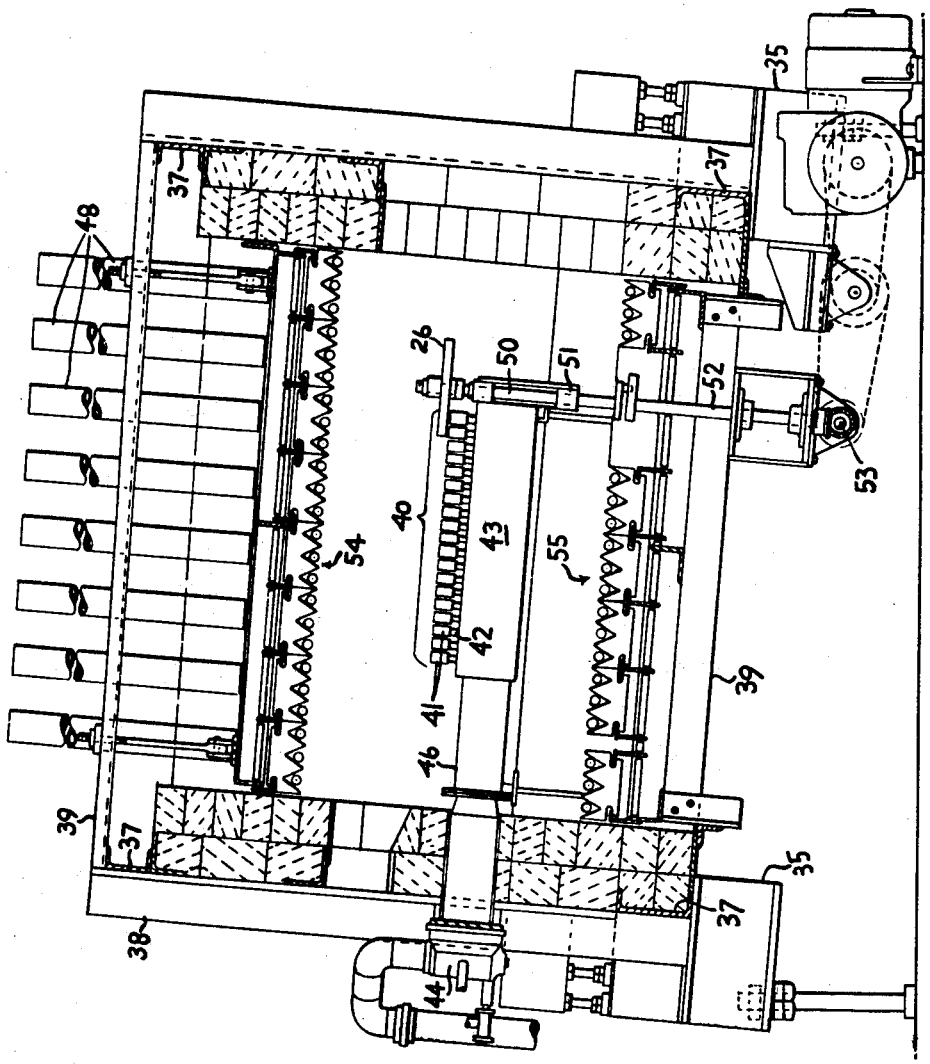
FIG. 4 is a detailed view partly in section and partly in elevation taken along the line 4—4 of FIG. 2.

Referring to FIGS. 2, 3, and 4, the gas film support heating section B is made up of three similar contiguous units 36, each located within a supporting framework as shown in FIG. 4. The supporting framework consists of girders 37, stanchions 38, and beams 39 resting on support blocks 35.

Each unit 36 includes a flat bed 40 of modules 41 in spaced but close juxtaposition each to the other and arranged geometrically like a mosaic. In the embodiment illustrated, all modules 41 have their upper termini of rectangular configuration and defining a common surface that changes from flat to curved in the direction of glass travel, as shown in more detail in FIGS. 6 to 8. The modules 41 are arranged in successive rows crossing the intended path of travel of the workpiece, each row being at an angle other than 90 degrees from the path and spaced close to the next adjacent row.

Each module 41 has a stem 42 of smaller cross sectional area than the upper terminus and each opens into a plenum chamber 43 positioned below the bed 40 and acting as a support therefor. See FIG. 4. Each module is substantially enclosed and separated from other modules by a space that provides an exhaust zone. The bed is adjusted to such a level that the plane of the upper termini of the modules lies parallel to, but just below by approximately the height of the gap between the modules and the support height of the glass sheet, the plane defined by the upper surfaces of the conveying rolls 20 of the preheat section. At one side, each plenum chamber 43 is in communication with five gas burners 44 through orifices 45 (FIG. 1) and flexible couplings 46. A plurality of vents 48 project through the roof of each unit 36 to exhaust the interior to the atmosphere. Driving members 26 are mounted on shafts 50, journals 51 for which are supported by the supports for the plenum chambers. Each shaft 40 is driven through a coupling by a shaft 52 and a motor driven drive shaft 53. Radiant heat is supplied above and below the support bed 40 by radiant roof 54 and radiant floor 55.

To supply air under pressure to the hot gas support combustion system, blowers 60 feed air under pressure to manifolds 61 of each unit 36 and thence to gas burners 44. Gas is introduced into burners 44 through conduits, not shown. Each burner 44 is of the so-called direct-fired, air-heater type. The combustion of the products in the combustion chamber produces sufficient plenum pressure to supply the modules with heated gas of uniform temperature and pressure.

FIGS. 6 to 8 show a transitional portion of module bed 40 for use in bending glass while it is supported on a flow of gas. The heights of the modules 41 from the plenum chamber 43 are selectively and progressively changed, both in the direction of glass travel and in a direction transversely thereto, by reducing the depths of the module cavities in varying degrees to gradually change the surface defined by the upper termini of the modules from flat to curved. Because each module supports an overlying portion of the glass at a uniform distance from its terminus, the deformable glass will bend as it progresses, conforming to the shape of the bed.

Next adjacent the gas support heating section B in the direction of travel of the workpiece is quenching section C. See FIGS. 1, 3 and 5. The quenching section C includes curved beds of modules 80 arranged in mosaic pattern similar to that of the gas film support heating bed. Each module 81 has ta stem 82 smaller in cross section than the upper terminus and projecting through a cooling box 83 into a plenum 84, the cooling box and upper surface of the plenum acting as a support for the modules. The surface of the upper termini of the modules is adjusted to such level that it lies at the same level and in the same contour as that of the end portion of the gas film heating bed next preceeding.

Above the bed 80 and supported in such fashion as to be capable of being raised and lowered, is a head assembly 92 which, in essence, constitutes a mating part of the bed 80 and its associated heat exchange box 83 and plenum chamber 84. The upper and lower heat exchange boxes and the plenum chambers are supplied separately with heat exchange fluid and air in the like manner. The upper head assembly is rigidly fixed to cross bars or channels 97 and is vertically movable for adjustment.

Figure 5:
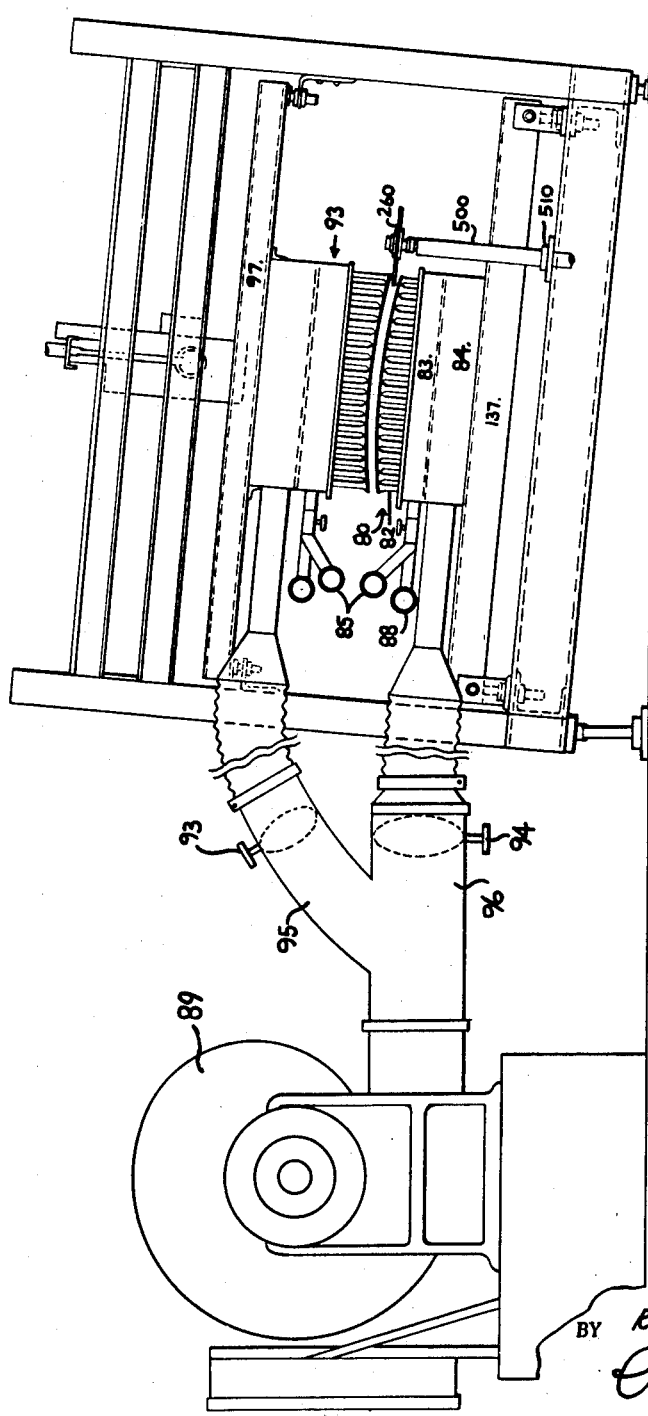
FIG. 5 is an end elevation of the quenching system and taken along the line 5—5 of FIG. 3 where it adjoins the heating section.

As shown in FIG. 3, quenching section C is divided into two adjacent beds of modules, indicated as section I and section II of substantially equal length. The distance between the upper and lower beds of each of these sections may be independently adjusted. Section I is subdivided into two sections IA and IB, section IA being somewhat shorter than section IB. Relatively cool gas, such as air at ambient temperature, is supplied to upper and lower plenums of sections IA, IB and II, each independently of the others, by separate blowers 89, 90 and 91, respectively. Independent control of flow and pressure to upper and lower plenums of each section from the blowers common thereto is afforded by suitable valves 93 and 94 in the individual conduits 95 and 96 feeding each plenum. As shown in FIG. 5, throttle valve 93 in conduit 95 controls the flow and pressure from blower 89 to the upper plenum of section IA and throttle valve 94 in conduit 96 controls the flow and pressure to the lower plenum. The independent blowers 89, 90 and 91 facilitate separate control of the flow and pressure to each of the three sections of the quench.

Heat exchange fluid, such as cooling water from inlet manifolds 85, is introduced into the cooling boxes and discharged therefrom into outlet manifolds 88. This serves to maintain the beds at a substantially uniform temperature throughout.

The conveying means for the quenching system includes disc-like driving members 260 having sufficiently narrow peripheral edges to extend inwardly and between the upper and lower module beds to frictionally engage one edge only of the workpiece and convey it along the bed in continuous straight line travel. Driving members 260 are mounted on shafts 500, journals 510 for which are supported by the supports for the lower bed. Each shaft 500 and the last three shafts 50 closest to the quenching section are geared to and driven by a drive shaft that may be driven at normal speed by a motor 147 or at high speed by a motor 146. See FIGS. 2 and 3. All drive members 26 and 260 are operated at normal conveying speed by motor 147. By a suitable drive shaft and clutch arrangement, the last three drive members of the heating section and the quench discs may be driven at a high speed by motor 146 while motor 147 continues to drive the remaining drive members at normal speed. Such high speed drive is controlled by a time-operated control mechanism 148 actuated by a pressure sensing element 149 near the end of the heating section. The sensing element is sensitive to the presence of a glass sheet in position to be transferred at high speed to the quench. After a time interval sufficient to allow transfer of the glass sheet, the time-operated control switches the drive of all drive members 26 and 260 back to normal speed motor 147.

As shown in FIGS. 1 and 3, the delivery roll section D consists of conveyor rolls 200 provided with guide collars 210 in alignment with discs 260 of the quenching section to maintain the proper position of the glass during transfer therefrom. Each roll is journaled in bearings 220 and is driven through gears 230 from a common shaft 240 energized by drive motor 250.

OPERATION

The following is an example, by way of illustration only, of a preferred mode of operation of the invention disclosed herein as applied to the treatment of glass sheets:

Flat sheets of glass ¼ inch nominal thickness (0.240 inch) and approximately 15 inches wide by 30 inches long are placed lengthwise seriatim upon the rolls 20 of preheat section A, properly aligned by guide collars 21 and conveyed on the rolls 20 into and through the preheat section at a line speed of approximately 240 inches per minute. Electric heating coils 22 above and below the moving glass supply heat to the preheat section at a sufficient rate to raise the temperature of the glass to approximately 950 degrees Fahrenheit surface temperature in approximately 30 feet of glass travel.

As the leading edge of the glass sheet leaves the last roll of the preheat section and progressively covers modules 41 forming support bed 40, the sheet becomes partly and finally fully supported by the uniform pressure of the gas emitted from the modules. The magnitude of this gas pressure is never large, and in any event, is held low enough and uniform enough from module to module so that it does not cause bowing or other deformation of the glass. Once the glass becomes gas supported, it is conveyed by edge contact through frictional engagement of its lower edge with rotating drive members 26. For this purpose, the entire system is positioned in a common plane tilted at an angle of 5 degrees with respect to the horizon to provide the glass with a component of force normal to the driving discs.

Gas burners 44 are supplied natural gas and air in proportions by volume of approximately 1 to 36, respectively, which includes 260 percent excess air over that required to provide complete combustion. The natural gas is provided at a rate of approximately 60 cubic feet per hour per square foot of bed. The products of combustion are introduced to the plenum chambers, producing therein a pressure of approximately 0.5 pound per square inch gauge. Each module includes orifices that reduce this pressure in the module cavities that are covered with glass to about $\frac{1}{21}$ of the plenum pressure. Gas is introduced to the stem of each module at a temperature of 1,200 degrees Fahrenheit and a volume flow of approximately 1.3 cubic feet per minute.

The module bed is formed first flat and then, as illustrated in FIGS. 6 to 8, to present a gradually changing plane of support from one that is initially flat to one that is convex and cylindrically curved about an axis parallel to the direction of travel. The radius of curvature of the curved portion of the bed is 60 inches. The change in curvature begins approximately 156 inches from the beginning of the heating section where the glass has attained a temperature level of about 1,200 degrees Fahrenheit and is sufficiently deformable to readily follow the gradually changing contour of the module bed at the speed at which the glass is conveyed.

The nominal module support pressure when covered by the quarter inch thick glass is 0.023 pound per square inch above that existing above the glass, which provides a nominal spacing of 0.010 inch between the underside of the gas film supported glass and the upper terminus of the module walls. The nominal exhaust pressure is substantially one atmosphere absolute.

To heat the glass, the supporting gas is held at a temperature above that of the glass during the heating stage until the glass has reached the desired temperature. In this case, heat is added to the glass both convectively and radiantly from the supporting gas, which is at a temperature of approximately 1,200 degrees Fahrenheit, and is added radiantly into the chamber from ceiling heating coils 54 at a temperature above that of the glass, usually about 1,300 degrees Fahrenheit. As glass is fed into the furnace, the heaters are actuated to supply the fluctuations in heat demands. In this manner, the temperature of the glass is raised to approximately 1,200 degrees Fahrenheit by the time (approximately 3.5 minutes) it completes its travel through the 66 foot length of preheat and heating section. Floor coils 55 beneath the plenum chambers help maintain the ambient heat level in the furnace chamber and keep the plenum boxes uniformly hot.

As the leading edge of the glass passes over the pressure sensing element 149 of a pressure switch on a time-operated control, a timer on the control mechanism begins to run. The timer is adjusted for the particular speed at which the glass is being conveyed to actuate the high speed run out when the leading edge of the glass reaches the end of the heating section. At this time the drive for the last three discs 26 of the heating section and all discs 260 of the quenching section changes from motor 147 to motor 146 through a suitable clutch and drive shaft arrangement. The glass sheet is rapidly conveyed from the heating section to the quenching section at a rate of approximately 10 inches per second. The timing device then returns the drive to normal speed motor 147 and the glass is conveyed through the quenching section at the normal speed of 240 inches per minute.

In the quenching section the upper and lower module beds are divided into two main sections I and II each five feet in length, and the first section is subdivided into two sections IA and IB, two feet and three feet in length, respectively. The beds are curved transversely of the path of travel in the same manner as the terminal portion of the heating section and of matching curvature (i.e., with a radius of curvature of 60 inches). Water is circulated through cooling boxes 83 at a flow rate of 1 gallon per minute per square foot of bed, the inlet temperature of the water being about 60 degrees Fahrenheit and the outlet temperature being about 80 degrees Fahrenheit. Each quench module bed of this example is formed of square modules having a surface area of approximately 2 square inches. An exhaust gap between the adjacent modules of approximately 3/16 of an inch is provided. Air at ambient temperature of about 140 degrees Fahrenheit is supplied independently to each section IA, IB and II of the quench through three blowers 89, 90, and 91 and the flow and the pressure to the top and bottom quench beds of each section are controlled to produce the following conditions in each section:

| Section of Quench | Module Pressure, ounces/in.² | Flow,ª s.c.f.m./in.² | Coefficient of Heat Transfer ᵇ | Spacing Modules to Glass |
| --- | --- | --- | --- | --- |
| IA (top) | 30 | 3.3 | .018 | .090 |
| IA (bottom) | 7 | 1.6 | .014 | .020 |
| IB (top) | 13 | 2.2 | .013 | .090 |
| IB (bottom) | 5 | 1.4 | .012 | .020 |
| II (top) | 11 | 2.0 | .013 | .110 |
| II (bottom) | 5 | 1.4 | .012 | .020 |

ª Air flow rate through module beds of quenching section expressed in standard cubic feet per minute oer square inch of glass surface area being quenched.
ᵇ G. cal./sec.·cm.²·° C.

As indicated by the above table, the glass is initially quenched, as it leaves the heating section at a temperature of approximately 1,200 degrees Fahrenheit, by cooling the top surface at a greater rate than the bottom surface. Any one portion of the glass sheet is subjected to this cooling rate for about 2.4 seconds. As the glass passes from quenching section IA to quenching section IB, the rate of cooling of the top and bottom surfaces of the glass sheet is diminished. The diminished rate is substantially maintained as the glass sheet passes into the second quenching section.

However, the top surface need not be cooled at a greater rate than the lower surface in stage IB and II because the top surface is being cooled at a higher heat transfer coefficient than the lower surface; however, the cooling rate of the top surface can be either greater than or less than the cooling rate of the other surface, depending upon the air to glass temperature differential. There can be a lesser difference in temperature between the air and the top surface of the glass then between the air and the bottom surface thereof. Therefore, the cooling rate of the bottom surface may then be greater than the top, even though the coefficient of heat transfer of the top module bed remains greater.

The sheet of glass is quenched in sections IB and II for a total time of about 12.6 seconds. The temper in the sheet and the modified configuration have already been substantially established in section IA. Sections IB and II, by virtue of the continued cooling temporarily maintain the sheet substantially in its initial configuration. Thus, the glass, as it passes through the quench, is maintained in a curvature substantially matching that of the quench bed. At the end of the tempering operation, the glass sheet is no longer deformable through viscous flow of the glass. The glass is then conveyed from the air support of the quenching system to the rolls of the delivery system by discs 260 and onto rolls 200. As the glass leaves the quench and cools to room temperature, it assumes a different curvature from that of the module bed due to the differential cooling in section IA. In this example, the glass sheet assumes a radius of curvature of 54 inches in the direction transverse to the direction of travel and a radius of curvature of 1,440 inches in a direction longitudinally of the path of travel. During the quenching process the glass sheet is maintained in substantial conformity to the curvature of the module bed, notwithstanding the differential cooling, because of the diminished rate of cooling applied through quenching sections IB and II.

Sheets of glass treated in the above manner have a resultant stress, in terms of the center tension thereof as indicated by the birefringent effect of the glass on polarized light rays, of approximately 3,300 millimicrons per inch of glass length, as measured by standard retardation techniques.

While the apparatus and operating example disclosed above illustrate a preferred embodiment of this invention, it will be understood that other apparatus may be utilized to practice the inventive concept herein disclosed and that the specific operating steps may be varied without departing from the inventive concept.

It will be apparent that other forms of apparatus for supporting and conveying sheets of glass on a gas or other fluid may be used in lieu of the particular embodiment disclosed, which utilized modules. For example, a porous bed or other form of perforated support plates may be used as long as the glass is uniformly supported while heated to a temperature suitable for bending and/or tempering. Alternatively, the glass may be balanced, supported or suspended vertically rather than horizontally.

When some marring or distorting of the glass can be tolerated, it is possible to convey glass on rolls throughout the entire heating and quenching operation. Such conveying techniques find particular use where the glass sheet is not deformed through viscous flow of the glass to a curvature but, rather, remains flat. The present invention may be used to alter such flat sheets to produce sheets having a compound curvature.

In some instances, there may be no need to maintain the glass sheets in their original or flat configuration during the quenching operation; for example, when the distance between the quenching nozzles and the glass is great. Where this is the case, an initially established differential cooling rate need not be diminished but, rather, the sheet may be allowed to bow during the quench. Such an arrangement is disadvantageous from the standpoint of accurately controlling the final curvature of the sheet because of the difficulty in accurately establishing the differential rates of heat transfer with large spacings between the nozzles and the sheet.

In the specific embodiment disclosed, the glass sheet is allowed to deform to a cylindrical curvature that is convex upward and the top surface of the glass is cooled more rapidly than the bottom surface. The differential cooling rate therefore increases the final overall curvature (i.e., decreases the radius of curvatures in both the transverse and longitudinal direction), thereby superposing a compound curvature upon a cylindrical sag bend. It will be readily apparent that the lower surface of the glass sheet may be cooled more rapidly than the upper surface. In addition, the sheet may be allowed to deform to a shape that is concave upward. Of course, the glass sheet may be initially deformed to curvatures other than cylindrical curvatures. Thus, a glass sheet initially formed to a compound curvature by heat deformation, e.g., by conveying the glass over a bed curved both transversely and longitudinally of the path of travel, may be changed to a compound curvature having different radii of curvature.

In general, to produce curvatures differing significantly from the initial, pre-tempering configuration, one side of the glass sheet should be initially cooled at a rate at least 10 percent greater than the rate at which the opposite side is cooled, and usually at a rate of at least 25 percent greater. The greater the differential, the greater is the change in curvature.

Normally, the glass sheet will be heated to a substantially uniform, i.e., isothermal, condition prior to quenching. The time of such heating will generally be on the order of minutes, usually less than ten minutes. It should be understood that an isothermal condition need not exist prior to quenching for the practice of the present invention. In fact, a non-uniform gradient may help maintain the glass in its initial configuration during the quenching operation by elevating the temperature of the surface that is to be cooled more slowly to an initially higher temperature than the opposite surface.

When a glass sheet is heated, it is possible, by raising the temperature of one surface above the temperature of the opposite major surface, to produce a temperature differential across the surfaces so that when the glass is quenched in the quench section and both sides cooled, a cooling rate differential exists between surfaces and results in a differential cooling of the major surfaces. Thus, differential cooling of the major sides can be achieved by heating each side to a different temperature within, or preferably through, the tempering temperature range, and producing a temperature gradient between the major surfaces, resulting in the production of a second configuration of the sheet when the temperature of the sheet is returned to room isothermal conditions approximately.

It has been found most advantageous from a practical standpoint to maintain the glass sheet in its original configuration during the application of unequal rates to opposite sides by abruptly diminishing the cooling rates during the quench and after the glass has been at least partially (but preferably not completely) cooled through the annealing range, but in all events before the glass has cooled to 800 degrees Fahrenheit surface temperature. Such abrupt change will normally diminish the cooling rates applied to the upper and lower surfaces by at least 10 percent. Alternatively, the decrease in the cooling rate need not be sudden, but rather can be progressively diminished in a programmed manner to maintain the flatness of the glass sheet. In all events, it is necessary, particularly initially, to cool the glass at a sufficiently rapid rate to secure the desired degree of temper.

What is claimed is:

1. In the process of tempering glass wherein a glass sheet is rapidly cooled from a temperature at the top of the tempering temperature range, the improvement which comprises: cooling the major sides of said sheet at different rates so that the temperature of one side of said sheet falls from the top to the bottom of said tempering range faster than the temperature of the other side falls from the top to the bottom of said range, reducing the cooling rate of the more rapidly cooled side to maintain the temperature of the less rapidly cooled side high enough to maintain the glass sheet in a first configuration present therein during said tempering range and continuing said cooling until the sheet is no longer deformable through viscous flow of the glass whereby a second configuration forms in said glass sheet.

2. In the process of tempering glass wherein a series of glass sheets are successively rapidly cooled from a temperature at the top of the tempering temperature range, the improvement which comprises: cooling the major sides of said sheets of said series at different rates so that the temperature of one side of said series falls from the top to the bottom of said tempering range faster than the temperature of the other side falls from the top to the bottom of said range, reducing the rate of cooling of the more rapidly cooled side to maintain the temperature of the less rapidly cooled side high enough to maintain the glass sheets in a first configuration present therein during said tempering range, and continuing said cooling until the sheets are no longer deformable through viscous flow of the glass whereby a second configuration forms in said glass sheet.

3. In a process for tempering glass, the improvement comprising heating the sheet to a temperature suitable for tempering, transporting the sheet between opposed quench beds, establishing spacings between major surfaces of the sheet and the adjacent quench bed that are less than 0.15 inch, quenching the sheet by impinging cooling fluid from the opposed quench beds against the major surface of the sheet at rates sufficient to temper the sheet, controlling the flow of said cooling fluid to cool one major surface of the sheet at a rate greater than the rate at which the opposite surface is cooled, and thereafter reducing the cooling rate of the more rapidly cooled side to maintain the temperature of the less rapidly cooled side high enough to maintain the glass sheet in a first configuration present therein during said tempering range and continuing said cooling until the sheet is no longer deformable through viscous flow of the glass whereby a second configuration forms in said glass sheet.

References Cited

UNITED STATES PATENTS 3,223,499    12/1965    Cypher et al. _____ 65—25
3,396,000    8/1968    Carson et al. _____ 65—104

ARTHUR D. KELLOGG, Primary Examiner

U.S. Cl. X.R.

65—106, 115

UNITED STATES PATENT OFFICE
CERTIFICATE OF CORRECTION

Patent No. 3,497,340           Dated February 24, 1970

Inventor(s) Brook J. Dennison and Ronald R. Rigby, Jr.

It is certified that error appears in the above-identified patent and that said Letters Patent are hereby corrected as shown below:

Column 5, line 8, "ta" should read -- a --.

Column 7, in the Table, heading of second column, "Module Pressure ounces/iu.$^2$" should read -- Module Pressure Ounces/in.$^2$ --.

Column 7, in the Table, in footnote "a", "oer square inch" should read -- per square inch --.

Column 8, line 11, "then" should read -- than --.

Signed and sealed this 1st day of May 1973.

(SEAL)
Attest:

EDWARD M. FLETCHER, JR.                ROBERT GOTTSCHALK
Attesting Officer                      Commissioner of Patents